(12) United States Patent
Lloyd, Jr. et al.

(10) Patent No.: US 7,327,857 B2
(45) Date of Patent: Feb. 5, 2008

(54) NON-CONTACT MEASUREMENT METHOD AND APPARATUS

(75) Inventors: Thomas Watkins Lloyd, Jr., Indianapolis, IN (US); Joseph Benjamin Ross, Cincinnati, OH (US); Glen William Brooksby, Glenville, NY (US); Van-Duc Nguyen, Pleasanton, CA (US); John Lewis Schneiter, Latham, NY (US); Steven Jeffrey Gordon, Weston, MA (US); Faycal Benayad-Cherif, Lexington, MA (US); Victor Nzomigni, Rennes Cedex (FR); Donald Hamilton, Burnt Hills, NY (US)

(73) Assignee: General Electric Company, Niskayuna, NY (US)

( * ) Notice: Subject to any disclaimer, the term of this patent is extended or adjusted under 35 U.S.C. 154(b) by 688 days.

(21) Appl. No.: 10/797,329

(22) Filed: Mar. 9, 2004

(65) Prior Publication Data

US 2005/0201611 A1  Sep. 15, 2005

(51) Int. Cl.
*G06K 9/00* (2006.01)
(52) U.S. Cl. .................. 382/106; 382/152; 382/154
(58) Field of Classification Search ............... 356/602, 356/603, 604, 612, 614; 382/106, 152, 154
See application file for complete search history.

(56) References Cited

U.S. PATENT DOCUMENTS

| 4,482,971 A | 11/1984 | Blazek | 364/552 |
|---|---|---|---|
| 4,668,982 A | 5/1987 | Timmerino | 358/101 |
| 4,908,782 A | 3/1990 | Pekarek et al. | 364/560 |
| 5,047,966 A | 9/1991 | Crow et al. | 364/560 |

(Continued)

FOREIGN PATENT DOCUMENTS

EP  0338446  10/1989

(Continued)

OTHER PUBLICATIONS

European Search Report Jan. 2, 2006.
G.P. Stein, Accurate Internal Camera Calibration Using Rotation, With Analysis Of Sources Of Error, Artificial Intelligence Lab, MIT, Cambridge, MA 02139, May 20, 1995, pp. 230-236, 0-8186-7042-8/95 1995 IEEE.

(Continued)

*Primary Examiner*—Samir Ahmed
*Assistant Examiner*—Abolfazl Tabatabai
(74) *Attorney, Agent, or Firm*—Jean K. Testa; Curtis B. Brueske (57) ABSTRACT

A non-contact imaging apparatus for examining an object having complex surfaces or shape deformations. The imaging apparatus includes at least one imaging device for obtaining a scanned image of the exterior surfaces of the object being examined. A predetermined reference image) of an ideal model for the object is stored in a memory. An image register is coupled to the imaging device and to the memory containing the reference image of the ideal model for the object. A transformation estimator compares the scanned image to the reference image and provides a transform which maps the scanned image to the reference image and provides a set of registered object data points. One or more filter modules process the registered object data points with a priori information to reduce noise and to further enhance the accuracy and precision of the registration. A gauge estimator is coupled to the filter module. The gauge estimator utilizes the processed and registered object data to determine deformation parameters of the object, which are then displayed to an operator as gauging information.

13 Claims, 2 Drawing Sheets

U.S. PATENT DOCUMENTS

| | | | |
|---|---|---|---|
| 5,208,763 A | 5/1993 | Hong et al. ............ 364/551.02 |
| 5,521,847 A | 5/1996 | Ostrowski et al. ........... 264/559 |
| 5,627,771 A * | 5/1997 | Makino ...................... 702/155 |
| 5,715,166 A * | 2/1998 | Besl et al. .................. 700/182 |
| 5,828,769 A | 10/1998 | Burns ......................... 382/118 |
| 5,917,940 A | 6/1999 | Okajima et al. ............ 382/173 |
| 6,201,889 B1 | 3/2001 | Vannah ....................... 382/131 |
| 6,205,240 B1 | 3/2001 | Pietrzak et al. |
| 6,246,468 B1 * | 6/2001 | Dimsdale ................... 356/4.02 |
| 6,538,396 B1 * | 3/2003 | Vlahos et al. .............. 315/292 |
| 6,678,057 B2 * | 1/2004 | Harding et al. ............. 356/603 |
| 6,876,459 B2 * | 4/2005 | Tu et al. ..................... 356/614 |
| 2003/0117412 A1 | 6/2003 | Brooksby et al. |
| 2003/0231793 A1 * | 12/2003 | Crampton ................... 382/154 |

FOREIGN PATENT DOCUMENTS

| EP | 0381067 A | 1/1990 |
|---|---|---|
| WO | WO 0006969 | 10/2000 |

OTHER PUBLICATIONS

Glenn Healey and Raghava Kondepudy, CCD Camera Calibration and Noise Estimation, Proceedings 1992 IEEE Computer Society Conference on Computer Vision and Pattern Recognition, Jun. 15-18, 1992, Champaign, IL., pp. 90-95.

Van-Duc Nguyen, Victor Nzomigni and Charles V. Stewart, Fast and Robust Registration of 3D Surfaces Using Low Curvature Patches, Published in Internation Conference on 3D Imaging and Modeling, Ottawa, Oct. 1999, pp. 1-8.

A.P. Ashbrook, and R.B. Fisher, Contructing Models of Articulating Objects: Range Data Partitioning, 0-8186-7943-3/97, 1997 IEEE, pp. 164-171.

Kok F. Lai and Roland T. Chin, Deformable Contours: Modeling and Extraction, IEEE Transactions on Pattern Analysis and Machine Intelligence, vol. 17, No. 11, Nov. 1995, pp 1084-1090.

JF Mangin, V. Frouin, B. Bendriem, Nonsupervised 3D Registration of PET and MRI Data Using Chamfer Matching, 0-7803-0883-2/93, 1993 IEEE, pp. 1262-1264.

* cited by examiner

NON-CONTACT MEASUREMENT METHOD AND APPARATUS

STATEMENT REGARDING FEDERALLY SPONSORED RESEARCH

The US Government may have certain rights in this invention pursuant to contract number 70NANB5H1085 awarded by the National Institute of Standards and Technology (NIST).

BACKGROUND OF THE INVENTION

The present invention relates to a system for observing objects in three-dimensional space. More particularly, the invention relates to a multi-camera, three dimensional sensing system for observing an object by disambiguating reflections of multiple light patterns from a sensed object to obtain a set of data points defining the three dimensional shape of the object. This set of data points is then compared with a set of predetermined ideal shape information data points, or a reference model, to identify gauge measurements of the object.

Traditionally, gauge measurement of a manufactured object having a complex three dimensional surface such as an airfoil (e.g. turbine blade) is a tedious and time consuming process. Airfoils, including forged blades such as those used on aircraft engines, electrical power generators, and the like, are inspected for deformations which may include, but are not limited to, skew, twist, scaling, and translation. More specifically, airfoils are inspected for deformation parameters such as platform orientation, contour cross-section, bow and twist along a stacking axis, thickness, and chord length at given cross-sections.

One method of obtaining dense and accurate digital data representing these parameters for an individual airfoil is by use of a coordinate measuring machine (commonly known as a "CMM"). CMM's translate and rotate a sensor probe into contact with the surface of an object undergoing testing, to sample the position of various points on the object's surface. Before a sensor probe is brought into contact with the article under test, the object must first be fixed in a known physical position and orientation, such that a set of known reference points can be established. For airfoil measurement, six physical contact points are utilized, this arrangement being referred to by those skilled in the art as a "six point nest". Defining this set of six data points enables the position and orientation of the airfoil in its physical holder to be subsequently translated to any other coordinate system. CMM's provide dense measurements of the sample points. However, the time to scan an airfoil is relatively slow because the sensor probe must be continually repositioned to obtain data. After the necessary information on the surface points is collected, computer software processing computes deviations of these points from a computer assisted drawing (CAD) reference model and analyzes the deviations in terms of process-based shape deformations. Current CMM processing software, however, is also relatively slow.

An alternate method for obtaining data on these parameters, where speed is of importance, is by hard gauging using micrometers, calipers, shims and other gauges. In hard gauging, an object undergoing measurement is placed in close proximity to a set of molds or forms configured to exactly match the desired parameters of an ideal object. Comparisons are then made between the surfaces of the object being measured and the set of molds or forms using the mechanical gauges to determine if there are any deviations from the ideal object shape. It will be appreciated that hard gauging is costly since a new set of gauges must be machined for each object undergoing test, and they are inflexible to change. Further, while hard gauging is fast, it does not provide dense measurement data, but rather provides only individual measurements at a relatively few defined contact points.

Yet another method of obtaining measurements representing deformation parameters of an object employs full-field non-contact range sensors. These sensors scan the external surfaces of opaque objects, using laser or white light, significantly faster than CMMs. While the sensors are capable of scanning an object quickly and obtaining large quantities of data, the accuracy of this data is significantly lower than that obtained using CMMs. Examples of non-contact sensors include sensors based on laser line grating and stereo triangulation; and sensors based on single laser line scan plus rotation of the object. Additional non-contact sensors are based on phase-shifted Moiré patterns and white light.

Currently, there is a need for a system capable of obtaining accurate high-speed measurements of the surfaces of an object, efficiently and accurately registering the measurements to a set of reference surface measurements of an ideal object, filtering noise from the registered measurements, identifying surface deformations, and displaying the resultant gauging information to an operator. Further, there is a need for the system to be capable of being rapidly reconfigured to measure one or more differently shaped objects without the need to replace gauge components from one object to the next, if the objects are different.

BRIEF SUMMARY OF THE INVENTION

Briefly stated, the system of the present invention is directed to a non-contact imaging apparatus for examining a manufactured object having complex surfaces for shape deformations. The imaging apparatus includes at least one imaging device for obtaining a scanned image of surfaces of the manufactured object being examined. A predetermined reference model, or image of an ideal model for the manufactured object, is stored in a memory. An image register is coupled to the imaging device and to the memory containing reference image information for the ideal model. A transformation estimator compares the scanned image to the reference model and provides a transform by which the scanned image is mapped to the reference image to provide a set of registered object data points. One or more filters process the registered object data points with a priori information to reduce noise and to increase the accuracy and precision of the data points. The resulting information is passed to a gauge estimator which utilizes the processed and registered object data to identify gauge measurements for the manufactured object. The gauge measurements can be displayed to an operator, and utilized to control a manufacturing process by which the object is made.

The foregoing and other objects, features, and advantages of the invention as well as presently preferred embodiments thereof will become more apparent from the reading of the following description -in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

For purposes of this specification, the following definitions of terms are provided:

First, an "image" is defined as a collection of data representing properties, design specifications, or attributes of an object. For example, a data collection which represents the three spatial dimensions (X, Y, Z) of an object is an image of the object. When such data are obtained by measuring the object and storing the measurements in memory, the stored measured data is referred to herein as a "scanned image".

Second, data comprising a CAD drawing, or other set of engineering specifications in digitized format, relating to the shape of an object, are referred to herein as a "reference model" or "reference image" of the object. CAD data comprising the specification for an ideal model of the object to which the manufactured object is compared to detect flaws in the object is referred to herein as a reference image.

Third, "pose" is defined to be the spatial position (X, Y, Z) and orientation (roll, pitch, yaw) of an object with respect to a given viewpoint.

Next, "alignment", or "pose correction" or "registration", is defined as repositioning or reorientation of a first object with respect to a second object so that at least one alignment parameter of the first object (such as a planar position or angular orientation) is equal to the corresponding alignment parameter of the second object, at least to within a predetermined coarse tolerance. Registration is generally defined as the process of aligning a scanned image with a reference model or reference image within a predetermined tolerance. The registration process generally comprises two steps. The first step is to determine corresponding points, or features, of the scanned image and the reference image. The second step is transforming the scanned image and reference image to a common coordinate system. This transformation is typically a geometric transformation and may include translations, rotations, and scale changes. The transformation step positions the two images (scanned image and reference image) with respect to one another so that corresponding points on the two images represent the same point on the object being investigated. Since alignment or pose correction is considered a coarse relative positioning process, it can be followed by a registration step to achieve fine or more precise relative positioning of the scanned image and the reference image.

"Pose error" is defined as the difference between the position and orientation of an object as represented in the scanned image of the object and the position and orientation of the object as represented in the reference image of the object. Pose correction is the repositioning and reorientation of the object such that pose error is minimized.

Finally, "interpolation" is defined as the estimation of one or more values between two known values. The problem of accuracy is common to all transformations. Therefore suitable algorithms are required to interpolate values at transformed points from neighboring pixels in an image.

Figure 1:
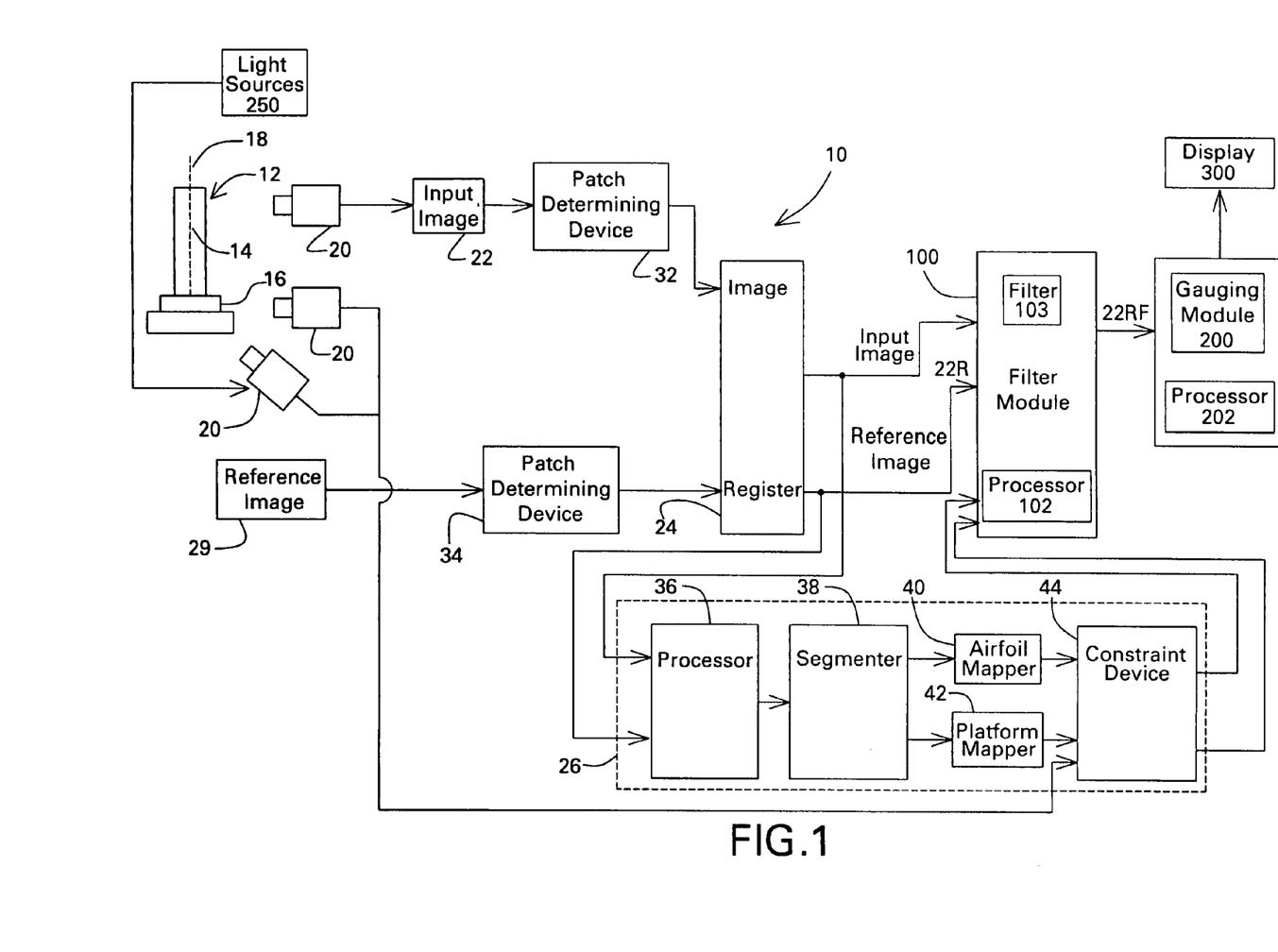
FIG. 1 is a block diagram of a non-contact sensor apparatus of the present invention for measuring and displaying gauging information of a manufactured object; and, FIG. 2 is a flowchart of the method, embodying the present invention, of measuring and displaying gauging information of a manufactured object.

Referring now to the drawings, FIG. 1 is a block diagram of an apparatus 10 for finding shape deformations of an object 12, according to one embodiment of the present invention. Apparatus 10 is adapted to inspect object 12 to identify gauge measurements for object 12 when compared to data representative of a known reference model or other ideal representation of the object. Gauge measurements of object 12 can then be displayed to an operator in a conventional format, if desired.

In one embodiment of the invention, object 12 comprises a blade, e.g., a turbine blade of an aircraft, having an airfoil 14 extending from a platform 16, and an axis 18. While the following description is directed generally to inspecting turbine blades, those skilled in the art will appreciate that the apparatus and the method of the invention are useful in finding and displaying gauge measurement information for any object having similar characteristics.

The object 12 to be inspected is positioned within the sensing range of an imaging device 20. Imaging device 20 is preferably a full field, non-contact, laser range sensor mounted on a translation stage. Full field, non-contact range sensors suitable for use as imaging devices 20 are currently readily available from commercial sources. For example, the model 4DI sensors sold by Intelligent Automation Systems may be employed with the present invention. The 4DI sensors utilize a laser line pattern projected onto object 12 and stereo triangulation imaging to obtain image data. Other suitable imaging devices 20 employ sensors configured to observe single laser line scans, phase-shifted Moiré patterns, or white light projected onto the surface of object 12, while object 12 is rotated about an axis, to obtain image data.

Object 12 is preferably secured to a rotating platform or rotary stage by five predetermined contact points. The object 12 is held at an orientation selected so as to reduce undesired surface reflections. Utilizing five predetermined contact points instead of the conventional six point nest permits a single degree of freedom for object 12. Alternatively, object 12 is secured in an unknown orientation which is be later determined using a robust least squares registration algorithm.

In one embodiment of the invention, a single imaging device 20 obtains one or more scanned images 22 comprising three dimensional data representative of the exterior surfaces of object 12. Each scanned image 22 is stored in a memory (not shown) for further processing.

In an alternate embodiment of the invention, a plurality of range sensors 20 mounted on a translation stage simultaneously acquire scanned images 22 representing surface data from object 12 for storage in a memory. A rotation stage is utilized to rotate object 12 about a rotational axis 18, permitting viewing of multiple surfaces of object 12.

Commercially available full-field, non-contact range sensors, such as the 4DI sensors, utilize structured laser lines projected onto the surface of object 12. These structured laser lines contain coherent noise known as speckle. The coherent noise present in these structured light systems can limit the performance of the system unless compensated for. One embodiment of the present invention acquires data related to three parameters, the imaging device 20 lens f-number setting, image scatter data indicative of the limit of noise (small speckles of light) reduction possible at each lens f-number setting, and the level of projected laser light coherence. These three parameters are then balanced to provide optimal performance by minimizing the coherent noise present in the structured laser lines projected onto the surface of object 12.

To improve the performance of the full-field, non-contact range sensors on objects 12 having shiny or prismatic surface features, one embodiment of the present invention orients object 12 at a preferred orientation relative to the source of the projected light or structured laser lines. Object 12 is oriented to present a view which approximately bisects any prismatic features of the object, while imaging device 20 is oriented perpendicular to the angle at which object 12 is presented. The light illuminating object 12 is polarized at a known angle to the plane defined by the light or laser source and imaging device 20. Additional polarizing filters are oriented at the same angle in front of the imaging device 20, so that any light reflecting off two or more faces of the prismatic surfaces is essentially blocked from imaging device 20.

In one embodiment of the present invention, objects having shiny or prismatic surfaces are imaged by one or more imaging devices 20 multiple times, and at varying light levels. The resulting images are then compared and combined to produce at least one composite image comprising data obtained from shiny surfaces at high light levels, and from dull surfaces at low light levels. In one embodiment of the invention, a scale value is applied to each level of light used to image the object, such that pixels from each of the various images may be scaled to produce the composite image having pixels representative of scaled values of light intensity lying within a predetermined range.

Data representative of a known reference model or reference image 29 of object 12 is stored in a memory (not shown), which may be an allocated portion of the memory in which a scanned image 22 is stored. Reference image 29 comprises digital data to which the scanned image 22 of object 12 is compared in order to identify gauging information. It will be understood by those skilled in the art that reference image 29 includes ideal characteristics of object 12.

There exist several types of reference models 29 suitable for use in the present invention. Among them are reference models or reference images 29 created prior to scanning an object 12 to be inspected, reference models or reference images 29 derived from other products shaped similarly to the object 12 to be inspected, reference models or reference images 29 derived from known defect-free objects, and reference models or reference images 29 generated from design data, such as CAD models of an ideal object.

In one embodiment of the present invention, the reference models or reference images 29 are utilized to increase the fidelity of the extraction of laser stripe data in scanned images 22 received at the imaging device 20. Using the reference image 29 as a guide, a two dimensional filter is generated for each point in a scanned image 22 of an object 12 undergoing inspection. Once a scanned image 22 has been processed using these filters, non-maximal suppression techniques are employed to identify the center lines of each of the laser stripes observed in the scanned image 22. This increases the laser stripe signal-to-noise ratio and improves measurement accuracy for the apparatus 10.

It is possible for portions or regions of scanned image 22 to become corrupted due to coherent speckle noise or other light interferences such as those caused by reflections from shiny surfaces of object 12. Using a reference image 29 and prior knowledge of expected laser stripe positions on the surface of object 12, laser stripes in non-corrupted regions of images 22 obtained by imaging device 20 can be used to synthesize laser stripes in those portions or regions of images 22 which are corrupted.

According to one embodiment of the present invention, patch determining devices 32 and 34 comprise processors 35 programmed to portion a scanned image 22 and a reference image 29 into a plurality of surface areas, referred to herein as patches. Patches are generated by first sampling reference image 29 using a Cartesian sampling grid with sampling points spaced equally in the x and y directions. The x and y directions are in the plane of a view defined by a view selector. The spacing between sample points is determined by the total number of patches selected by an operator with the ideal number of patches varying in accordance with the complexity of object 12, allowable computation time, and accuracy requirements. The number of patches selected must be sufficient to satisfy a number of constraints imposed on the registration. In general, the more patches are selected, the greater the accuracy of the registration process. Patch determining devices 32 and 34 operate independently of the other elements of apparatus 10. Data representing the determined patches are then stored in image register 24.

A transformation estimator 26 includes a processor 36 to which is supplied data representing the determined patches from image register 24. Transformation estimator 26 determines corresponding points between patches in scanned image 22 and patched in reference image 29. In one embodiment, two or more scanned images 22 of object 12 are taken at different rotational positions and fitted to a reference model of the object. The information from the two different positions is then used to identify the axis about which object 12 was rotated. Axis of rotation information is then used by transformation estimator 26, in conjunction with the patch information, to provide a more accurate and stable registration solution.

Optionally, registration accuracy may be further enhanced by illuminating object 12 with backlight to obtain outline images. With backlighting, an outline of object 12 is projected into three-dimensional space to provide additional constraints to the registration process carried out by the transformation estimator 26. For example, registration is particularly difficult for an object 12 having surfaces with regions of high curvature. Utilizing backlight to image the silhouette or "apparent contour" of object 12, multiple images of object 12, obtained from different angles, provide an approximation of the surface shape using a standard "space carving" algorithm. A reference image 29 of object 12 can then be fitted to the approximation of the surface shape in the area of interest, facilitating registration of the scanned image 22.

In one embodiment, adapted for use with objects 12 such as turbine blades, transformation estimator 26 further includes a segmenter 38, an airfoil mapper 40, a platform mapper 42, and a constraint device 44. Processor 36 aligns and registers the scanned data points of scanned image 22 with reference image 29. Segmenter 38 then separates the registered data of object 12 into airfoil data and platform data. Each segment of data is provided to the respective airfoil mapper 40 and platform mapper 42, each of which map the respective data to corresponding portions of the reference image 29. Constraint device 44 adds leading edge constraints and platform constraints to the registration. The resulting output of transformation estimator 26 is a transform (T) which maps scanned image 22 and reference image 29 to each other resulting in the registration of the scanned image to the reference image (hereinafter "registered scanned image 22R").

Referring further to FIG. 1, a filter module 100 includes a processor 102 which receives a registered scanned image 22R from filter module 100 and the reference image 29. These inputs provide the basis for one or more weighted filters 103. The filters 103 are applied to the registered scanned image 22R to remove noise and de-emphasize data points (known as outliers) lying outside a predetermined distance from the perceived surface of object 12. In one embodiment of the present invention, the filters 103 are designed to receive a registered scanned image 22R of a predetermined shape, and are configured to enhance image features lying within a region defined by the predetermined shape; while simultaneously de-emphasizing image features lying outside the region of interest.

In an alternate embodiment of the present invention, filter module 100 is configured to employ multiple reference images 29 of each region of an object, and to enhance any obscured image features in the registered scanned image 22R by reconstructing them from reference images 29 in which they are present. The output of the filter module 100 is a registered and filtered scanned image 22RF.

A gauging module 200 includes a processor 202 which receives the registered and filtered image 22R, and the reference image 29. In one embodiment of the present invention, gauging module 200 compares the surfaces of the registered and filtered image 22RF with those of reference image 29 to identify the contours of an object 12 represented by the registered and filtered image 22RF. Along each contour, the gauging module 200 identifies local bow, twist, and thickness values, so to simulate measurements made by hard gauging. In one embodiment of the present invention, these measurements are taken at predetermined locations on the registered and filtered image 22RF, corresponding to established hard-gauging locations, such as the six point nest traditionally used in the manufacture of object 12. Alternately, using the dense data acquired during the scanning process, gauging module 200 is configured to take a wide range of measurements from a random selection of locations on the registered and filtered image 22RF. The gauging module 200 identifies one or more actual gauging measurements and/or nominal gauging measurements.

To provide improved measurements of objects 12 having thin edges, one embodiment of the invention incorporates one or more positional white light sources 250 adapted to produce a linear highlight along the edges of object 12; for example, the leading edge of an airfoil. Preferably, the positional light sources 250 are located coincident with imaging device 20 to exploit similarity of illumination and occlusion boundaries in the images 22 obtained. An image 22 including a linear highlight, as seen through the imaging device 20, has similar properties to an image 22 including a laser stripe along a smooth surface of object 12. Accordingly the image 22 including a linear highlight is processed using the same algorithms that detect the laser stripe in the standard structured light system, to provide additional gauging data.

In one embodiment of the invention, the white light source 250 is positioned to the side of an object 12 having a thin rounded edge. The position of the white light source 250 is selected to create an outline as a line of light reflected from the thin rounded edge, as seen by a imaging device 20. The imaging device 20 obtains an image 22 including the reflected outline, which is then used to locate the edge of object 12 using the structured laser stripe processing algorithms previously discussed.

A display 300 associated with the apparatus 10 may optionally receive signals from the gauging module 200 to present a display of one or more of the actual and/or nominal gauging measurements to an operator. Alternatively, one or more of the actual and/or nominal gauging measurements obtained by the apparatus 10 may be utilized in a feedback control loop or to otherwise direct the operation of an assembly line.

In an alternate embodiment of the invention, the functions of patch determining devices 32 and 34, transformation estimator 26, filter module 100, and gauging module 200 are implemented by sets of software instructions executable on a general purpose processor. This processor communicates with image register 24 to access data stored therein, and optionally with display 300 to provide an output to the operator.

Figure 2:
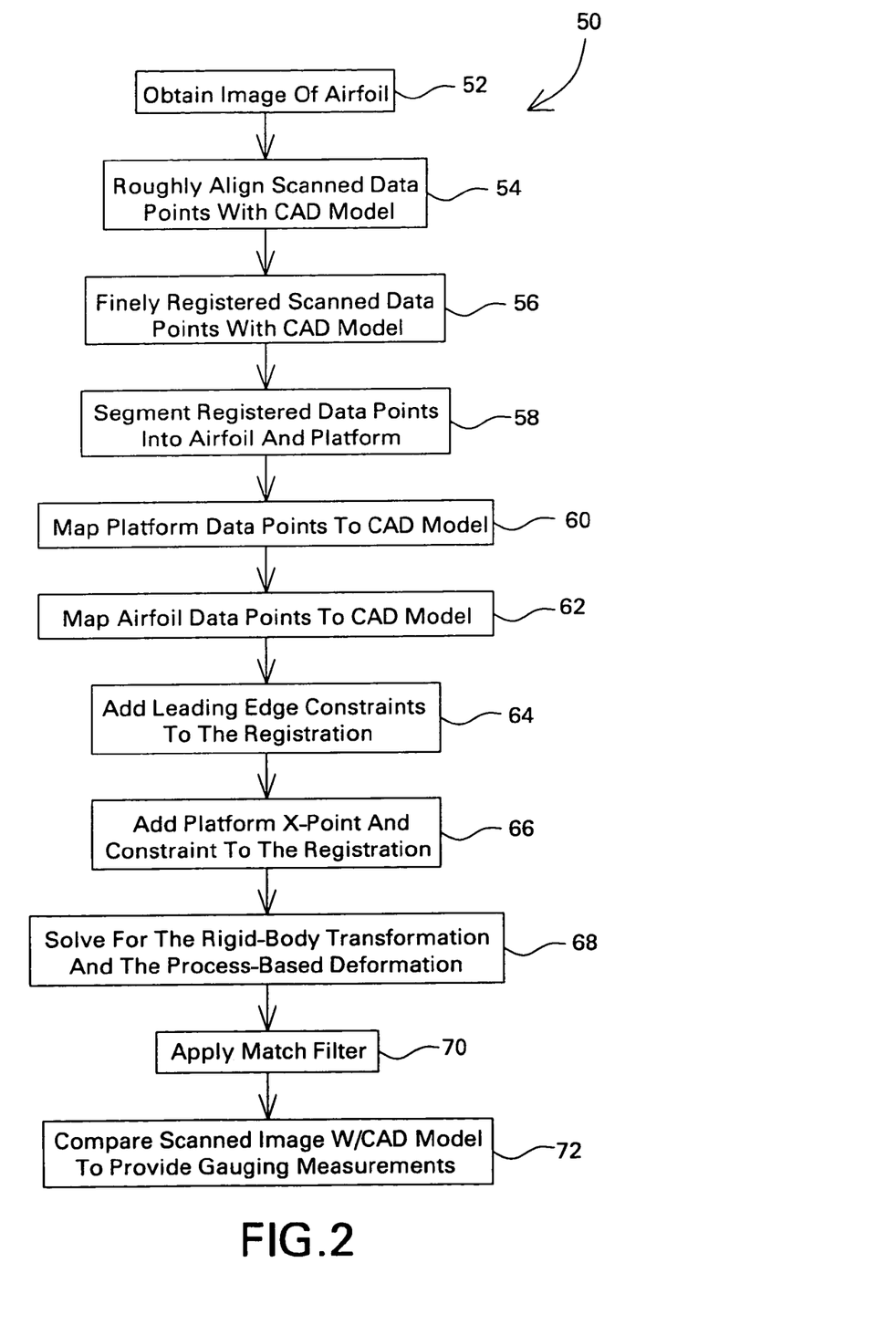

Referring now to FIG. 2, the method of non-contact gauge measurement of an object 12 (FIG. 1), such as a turbine blade, in an exemplary embodiment of the invention is illustrated.

At step 52, object 12 is scanned by imaging device 20 to obtain data points comprising one or more scanned images 22 of the blade. Multiple images from different perspectives, and/or using different light sources, are combined to form a cloud of data points defining the three-dimensional surface of object 12. In step 54, processor 36 of transformation estimator 26 aligns the centers of gravity and the moments of inertia of the surface data points representing object 12 with corresponding data from reference image 29. As a result of this alignment, scanned data of object 12 is aligned with data from reference image 29 to produce a large area (domain) of convergence. This is defined to a translation up to about +/−one-half the size of object 12, and a rotation of up to about +/−45°.

In one embodiment of the invention, robust registration of the data points using patches having low curvature is performed by a Robust Closest Patch (RCP) algorithm which accurately registers the scanned image 22 data points to corresponding data points comprising reference image 99, using all points associated with visible and stable surfaces of object 12. In step 56, the scanned data points representing object 12 are registered to reference image 29 using a robust least-squares algorithm and matching of low curvature patches. Patches are regularly sampled across the view of object 12. Each patch is defined by $(\vec{P}, \vec{n}, r)$, where $\vec{P}$ is a three dimensional point approximately in the middle of the patch, $\vec{n}$ is a unit vector normal to the patch at $\vec{P}$, and r is the patch radius. The patch radius r is selectable by the operator and is the same for all the patches. Preferably, the selected patch radius r value is about 1 to 3 times the approximate distance between the reference image 29 sampling points in the x and y directions, as defined by the view selection.

For computational efficiency, it is desirable to reduce the number of patches used in fine registration by discarding those patches that lie in a high curvature area on the surface of object 12. To do this, the local curvature of the surface of object 12 is computed using one of several techniques well known in the art, and those patches whose local curvature is above a predetermined curvature threshold are discarded. The curvature threshold is a parameter input by the operator. There is no precise specification for selecting the value of this parameter, but it is expected that a qualified operator can determine an appropriate value which will result in the desired computation speed, based upon the complexity of object 12, and without undue experimentation.

The RCP algorithm iteratively matches reference image 29 patches to data surfaces based on the current pose of object 12, and then re-estimates the pose based on these matches, using a pyramid processing technique. In general, pyramid processing iteratively computes and refines an estimate by processing first with a coarsely sampled data space and then successively refining the sample density. Preferably, three levels of pyramid processing are sufficient to refine the alignment between the scanned image 22 and reference image 29 to a required level of accuracy. Pyramid processing at level 3 uses all N patches defined on the surface of object 12; level 2 uses approximately N/2 patches; and level 1 uses approximately N/4 patches. Patches are different for different levels of the pyramid processing. The patches at Level 1, for example, are created using sampling points approximately twice as far apart as sampling points used in creating patches at Level 2, and so forth. Preferably, the patches for each level of pyramid processing are computed and stored prior to starting the processing.

In one embodiment, the level of the pyramid processing at which the patch alignment procedure starts is determined by the operator. The choice is subjective but guided by the following: the more confidence the operator has in the accuracy of the initial registration or alignment of the scanned image 22 of object 12 with reference image 29, the higher the level at which pyramid processing is started. Thus, if the operator believes that the initial registration is quite good, the operator may choose to start pyramid processing at Level 3. If the operator is not at all confident about the initial registration, the operator may choose to start pyramid processing at Level 1 and let the computations proceed up through Levels 2 and 3 before terminating with the best estimate of the correspondence between reference image 29 and scanned sensor data representative of object 12.

Calculation of an axis of rotation 18 of object 12 is optionally utilized to further enhance the accuracy of the RCP algorithm.

In step 58, segmenter 38 of the present invention is adapted for inspection of objects 12 such as turbine blades, and segments the registered data points into data points representative of both turbine blade airfoil 14 and turbine blade platform 16. This is done based on the proximity of the scanned data points to the reference image 29 airfoil or platform. The platform 16 provides a reference for mapping the data points to reference image 29.

In step 60, a platform mapper 42 maps the platform data points to reference image 29 through a rigid-body transformation comprising three translations and three rotations.

In step 62, an airfoil mapper 40 maps registered data points on airfoil 14 to reference image 29 through a rigid-body transformation.

In step 64, a constraint device 44 adds leading edge constraints to the steps of registering airfoil 14 to reference image 29. The leading edge constraints are derived from at least one, but preferably two, scanned images 22 received by a pair of imaging devices 20. In one embodiment of the invention, airfoil 14 is back-lit to project a profile of the airfoil edge to imaging device 20. Additional images may be obtained with the airfoil edge illuminated from a positional white light source 250 (FIG. 1), providing further edge location data.

The leading edge constraints approximate a conventional CMM six-point nest of contacts. In other words, the added constraints fixture the leading edge with four point contacts. These constrain two orientations and two locations. In step 66, a platform x-point constraint is added to the registrations, which is equivalent to one point of contact on platform 16. This, in effect, zeros out the translation along stacking axis 18. Low curvature patches on the airfoil 14 provide a sixth point contact near the trailing edge of the airfoil 14.

In step 68, the rigid-body transformation is solved from the low-curvature patches and the additional constraints on the leading edge and platform. The data points of the rigid-body transformation are segmented, with data points segmented into airfoil 14 and platform 16, so different constraints and transformations can be applied thereto. In one embodiment of the invention, a total of twelve transformation parameters comprising three translations, three rotations, and six deformation parameters are used.

In step 70, reference image 29 is used as a basis for a filter which is applied to the transformed or registered data points obtained from the scanned image 22 to de-emphasize noise and outlying data points. The scanned image data is not expected to be noise free. To mitigate noise and reduce its effects on the sought for best estimate of the correspondence between reference image 29 and scanned image 22, the scanned image data is processed through one or more filters.

Filtering involves two steps: prefiltering and global filtering. During prefiltering, which is optional, a local filter is applied to scanned image patch data. An example of a local filter is a median filter, such as is well known in the art. The purpose of this prefiltering step is to remove outliers; i.e., data points grossly in error.

The second, global filtering step involves two elements. The first of these addresses a robust estimate of the distance from the center of a patch to a corresponding reference image 29 data point. The second addresses the global smoothness of the sensor surface. Global filtering is also performed in a pyramid processing context.

For each point on the surface of reference image 29, a distance to a corresponding point on the surface of the image data is measured. The measurement is made in the direction of a unit vector, $\vec{n}$ which is normal to the reference model data. This is the first of the global filtering terms and is an intra-patch computation.

The distance computation is performed to minimize a robust least squares distance. This is done for each patch by minimizing $$\sum_{i \in Patch} \rho_\sigma \left[ (d_i - m_i) \cdot \vec{n} - \hat{d} \right]$$

where:

$$\rho_\sigma(x) = \frac{x^2}{\sigma^2 + x^2};$$

$\{m_i\}$ is a reference model data point in the patch;
$\{d_i\}$ is a sensor image data point in the patch; and
$\hat{d}$ is the deviation, a scalar quantity that is constant over the entire patch.

This function makes the least squares calculation robust in that it behaves as an x-squared weighting when x is small and approaches unity as x becomes ever larger. It thus de-emphasizes large values of x and is considered robust to outliers and to grossly large differences that may have resulted from locally very noisy sensor data. The choice of the parameter σ is somewhat arbitrary. Preferably, σ is selected to be approximately two to three times the root means square (rms) of the sensor noise.

The second of the global filtering terms is also an inter-patch computation. Here the object is to adjust $$\sum_{i \in Patches} \rho_{\sigma_1}\left[(d_i - m_i) \cdot \vec{n} - \hat{d}\right] + \alpha \sum_{k,k' \in Neighbors} \rho_{\sigma_2}(d_k - d_{k'})$$

for each level of the pyramid computations. The parameter α is also somewhat arbitrary and is preferably selected by an operator without undue experimentation.

In step 72, the resulting data points, representing the scanned object 12, are compared with reference image 29 to simulate measurements made by hard gauging. In one embodiment of the invention, the results of the simulated measurements are displayed to an operator (i) in the form of actual values, and (ii) in the form of variation values.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or an other computer readable storage medium; wherein, when the computer program code is loaded into, and executed by a computer, the computer becomes an apparatus for practicing the invention.

The present invention can still further be embodied in the form of computer program code, for example, whether stored in a storage medium, loaded into and/or executed by a computer, or transmitted over some transmission medium, such as over electrical wiring or cabling, through fiber optics, or via electromagnetic radiation. When the computer program code is loaded into and executed by a computer, the computer becomes an apparatus for practicing the invention. When implemented in a general-purpose microprocessor, the computer program code segments configure the microprocessor to create specific logic circuits.

It will be readily apparent that by implementing the present invention in the form of computer program code, such as sets of software modules, a conventional non-contact optical sensor system may be configured to provide a high speed, dense, and accurate gauge measurement system. Further, the system is readily adaptable to provide gauge measurement information for a wide range of objects without extensive reconfiguration.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A non-contact measurement system for providing gauge measurements of an object, comprising:
    at least one light source to illuminate said object with structured light;
    an imaging device to obtain at least one image of said illuminated object;
    an image register configured to store information corresponding to a reference model of said object and at least one image of said object;
    a transformation estimator coupled to said image register and adapted to register said at least one image of said object to said object reference model; and
    a gauge measurement module configured to receive said registered image of said object and to identify gauge measurements from said registered image of said object.

2. The non-contact measurement system of claim 1 wherein said image register is configured to store one or more sets of patches associated with said object reference model and one or more sets of patches associated with said at least one image of said object.

3. The non-contact measurement system of claim 2 wherein said transformation estimator is configured to compare patches associated with said object reference model with corresponding patches associated with said at least one image of said object to register said at least one image of said object with said object reference model.

4. The non-contact measurement system of claim 1 further comprising a filter module coupled to said image register for filtering a registered scanned image and removing noise.

5. A method of providing non-contact gauge measurements of an object comprising the steps of:
    projecting structured light using at least one light source on said object to illuminate said object;
    obtaining at least one image of said illuminated object;
    providing data representative of a known reference model of said object;
    registering said image with said reference model data; and
    identifying gauge measurements of said object from said registered image of said object.

6. The method of claim 5 for providing non-contact gauge measurements of an object wherein the step of registering said image with said reference model data includes performing, at least once, the steps of:
    (a) comparing a plurality of patches of said reference model data with a plurality of associated patches of said image to identify pose data for said image; and
    (b) adjusting the pose of said image response to said identified pose data.

7. A non-contact measurement system for providing gauge measurements of an object, comprising:
    at least one light source adapted to illuminate said object;
    at least one imaging device for obtaining a scanned image of said illuminated object;
    a memory configured to store data representative of a reference model of said object and data representative of at least one scanned image of said object obtained by said at least one imaging device;
    at least one software module configured to manipulate said scanned image to increase a signal-to-noise ratio;
    at least one software module configured to register said scanned image with said reference model data;
    at least one software module configured to process said scanned image to facilitate identification of edges of said object; and
    at least one software module configured to extract gauge measurements from said scanned image.

8. The non-contact measurement system of claim 7 for providing gauge measurements of an object wherein said light source is adjustable to alter an illumination level and said imaging device adapted to acquire two or more images of said object wherein each of said two or more images acquired at a different illumination level.

9. The non-contact measurement system of claim 8 for providing gauge measurement of an object wherein said at least one software module configured to manipulate said scanned image to increase a signal-to-noise ratio is further configured to generate a composite image from each of said two or more images acquired at different illumination levels.

10. The non-contact measurement system of claim 9 wherein said composite image comprises pixels representative of scaled values of light intensity within a predetermined light intensity range.

11. The non-contact measurement system of claim 7 for providing gauge measurement of an object wherein said at least one light source is positioned to provide backlight illumination on said object; and, said imaging device is further configured to obtain at least one image of said object illuminated by said backlight illumination at a first object orientation; and, said at least one software module configured to register said scanned image with said reference model data is further configured to incorporate said at least one backlight illuminated image into registration processing.

12. The non-contact measurement system of claim 11 for providing gauge measurement of an object wherein said imaging device is further configured to obtain at least a plurality of images of said object illuminated by said backlight illumination, each of said plurality of images at an associated object orientation; and said at least one software module configured to register said scanned image with said reference model data further configured to utilize each of said plurality of images to approximate surface features of said object.

13. The non-contact measurement system of claim 7 for providing gauge measurement of an object wherein said at least one light source is positioned and configured to produce a linear highlight along an edge of said object; and wherein said at least one software module configured to process said scanned image to facilitate identification of edges of said object further configured to identify said linear highlight in said scanned image.

* * * * *

UNITED STATES PATENT AND TRADEMARK OFFICE
CERTIFICATE OF CORRECTION

PATENT NO. : 7,327,857 B2 Page 1 of 1
APPLICATION NO. : 10/797329
DATED : February 5, 2008
INVENTOR(S) : Lloyd, Jr. et al.

It is certified that error appears in the above-identified patent and that said Letters Patent is hereby corrected as shown below:

In Column 8, Line 43, delete "99," and insert -- 29, --, therefor.

Signed and Sealed this

Twenty-fifth Day of November, 2008

JON W. DUDAS
*Director of the United States Patent and Trademark Office*